United States Patent [19]

Andrews et al.

[11] Patent Number: 4,920,364
[45] Date of Patent: Apr. 24, 1990

[54] LIQUID CRYSTAL DYNAMIC ATTENUATOR FOR LASER PRINTERS

[75] Inventors: John R. Andrews, Fairport; Werner E. Haas, Webster, both of N.Y.; Jean-Michel Guerin, Glendale, Calif.

[73] Assignee: Xerox Corporation, Stamford, Conn.

[21] Appl. No.: 349,667

[22] Filed: May 10, 1989

[51] Int. Cl.$^5$ .............................................. G01D 15/00
[52] U.S. Cl. ...................................... 346/160; 346/108
[58] Field of Search ................... 346/160, 107 R, 108, 346/76 L; 358/300, 302

[56] References Cited

U.S. PATENT DOCUMENTS

| | | | |
|---|---|---|---|
| 3,967,881 | 7/1976 | Moriyama et al. | 360/150 |
| 3,991,241 | 11/1976 | Matsumoto et al. | 428/1 |
| 4,039,252 | 8/1977 | Mizuno et al. | 350/160 |
| 4,043,640 | 8/1977 | Berreman | 350/160 |
| 4,068,926 | 1/1978 | Nakamura et al. | 350/160 |
| 4,559,546 | 12/1985 | Yip | 346/160 |
| 4,764,778 | 8/1988 | Spektor et al. | 346/160 |

FOREIGN PATENT DOCUMENTS

| | | | |
|---|---|---|---|
| 53-64533 | 6/1978 | Japan | 346/160 |
| 56-88112 | 7/1981 | Japan | 346/160 |

OTHER PUBLICATIONS

"Wide Dynamic Range CCD Camera"; Younse et al., SPIE 501, 55 (1984).
"Optical Rotatory Power of 90° Twisted Nematic Liquid Crystals", Wu et al., Appl. Phys. Lett., vol. 44, pp. 842-844 (1984).
"Liquid Crystal Device for Optical Radiation Control", Azarov et al., Instrum and Exp. Tech. (U.S.A.), 24, 487 (1981).
"The Optical Properties of Twisted Nematic Liquid Crystal Structures with a Twist Angle $\leq 90°$", Gooch et al., J. Phys., vol. 8, pp. 1757-1584, (1975).
"CVI Produces a Polarizer for Every Purpose", CVI Laser Corporation.

Primary Examiner—Arthur G. Evans
Attorney, Agent, or Firm—Frederick E. McMullen

[57] ABSTRACT

A variable attenuator for controlling scanning beam intensity having a twisted nematic liquid crystal for rotating the beam, a polarization analyzer for detecting the degree of alteration in the polarization of the beam by the crystal comprising a polarizing beam splitting plate separating the beam into primary and secondary beams, a photocell providing a signal reflecting the intensity of the secondary beam, a control for adjusting power to the crystal in response to the signal, a glass plate at an angle of incidence equal to but opposite from that of the beam splitting plate for correcting aberrations to the primary beam, and an anti-reflective coating on the optical surfaces of the crystal.

In a second embodiment, the plates are replaced by a polarizing cube. In a third embodiment, to obviate fluctuations in the attenuator output, the glass plate instead serves as the source of the beam component to the photocell.

10 Claims, 5 Drawing Sheets

LIQUID CRYSTAL DYNAMIC ATTENUATOR FOR LASER PRINTERS

The invention relates to raster output scanners, and more particularly, to a variable attenuator for controlling scanning beam intensity in raster output scanners.

Control over the light exposure level at the xerographic photoreceptor is required in all laser printers if acceptable prints and copies are to be produced. Indeed, imaging beam intensity is critical if the proper exposure level for the particular photoreceptor used is to be assured, and if variations in intensity across the scan line and from scan line to scan line, and in the laser output power, and in the transmittance, reflectance, and throughput efficiency of the various optical components are to be compensated for. And today, exposure control takes on added importance and criticality with the drive toward increased print resolution, half-toning, single-pass highlight color, and other developments where an intensity variation of no more than $+/-1\%$ is desired.

Where gas lasers are used as the scanning beam source, light intensity is not directly variable at the source however. In the past, if intensity control were to be provided, the drive power to the acousto-optic modulator was typically controlled. This allowed the diffraction efficiency of the modulator to be adjusted which in turn controlled the intensity of the scanning beam and provided the exposure levels desired. Today, however, the demand is for uniform exposure across the photoreceptor. That together with other performance factors requires that the modulator be operated at saturating radio frequency power levels, precluding control over beam intensity by controlling modulator drive power.

Since exposure control through adjustment of the modulator drive power is no longer an available option, other control techniques have been considered and tried but without success. These include the addition of neutral density filters to the scanner optical system; another, supporting the entire laser tube assembly for rotation, so as to permit the laser to be turned for optimum polarization with respect to the modulator. Unfortunately, the use of neutral density filters and adjusment of the laser tube assembly can only be implemented manually, greatly limiting their desirability. Further, the use of neutral density filters can induce flare light and cause beam aberrations, while permitting adjustment of the laser tube assembly can result in pointing errors in the laser beam and require subsequent realignment of the optical components following each adjustment.

In the prior art, U.S. Pat. No. 4,559,546 to Yip discloses a raster output scanner in which a twisted nematic liquid crystal provides controlled rotation of the plane of polarization of the laser beam, such control being in response to beam intenstiy monitored at the photoreceptor. Another U.S. Pat. No. 4,043,640 to Berreman, discloses controlling the transmission characteristics of a liquid crystal twist cell by sandwiching a liquid cystal material between two perpendicular polarizers and applying an a.c. voltage, while U.S. Pat. No. 3,967,881 to Moriyama et al. discloses another liquid crystal structure designed to provide different displays in which the cell is disposed between a linear polarizer and a guest/host-type liquid crystal cell. U.S. Pat. No. 4,039,252 to Mizuno et al. also dicloses a liquid crystal in which a pair of spaced electrode glass plates are aligned at an angle of slightly less than 90 degrees with one another to provide good homogenity, while U.S. Pat. No. 3,991,241 to Matsumoto et al. discloses a liquid crystal having a special substrate capable of orienting the liquid crystal molecules uniformly.

Further, U.S. Pat. No. 4,068,926 to Nakamura et al. employs a twisted nematic liquid crystal cell sandwiched between achromatic and colored linear polarizers to provide a color display, while Japanese Patent application No. 56-88112 discloses a liquid crystal with transparent electrodes and orientation layers for a multi-layered twisted nematic device, and Japanese Patent application No. 53-64533 discloses a multilayered twisted nematic liquid crystal using a control electrode layer as a switch.

In "Wide Dynamic Range CCD Camera" (J. M. Younse et al, SPIE 501,55[1984]), there is described application of a liquid crystal attenuator to a CCD camera. Another publication, "Optical Rotatory Power of 90° Twisted Nematic Liquid Crystals" (S. T. Wu, et al, Appl. Phys. Lett., Vol. 44, pp. 842–844, [1984]) describes a technique for measuring the rotating power of 90° twisted nematic liquid crystals in the visible and infrared spectral regions while "Liquid Crystal Device for Optical Radiation Control" (A. D. Azarov et al. Instrum and Exp. Tech [USA]24,489 [1981]) describes a liquid crystal cell used as an attenuator. And "The Optical Properties of Twisted Nematic Liquid Crystal Structures with a Twist Angle $\geq 90°$" (C. H. Gooch et al, J. Phys. D:Appl. Phys., Vol. 8, pp. 1575–1584, [1975]) describes a process for making liquid crystal twisted nematic structures with twist angles other than 90°.

Further, the advertisement "CVI Produces a Polarizer for Every Purpose" by CVI Laser Corporation describes three commercially available polarizer types.

In contrast to the prior art, the present invention provides, in a raster output scanner having a laser providing a high intensity beam, and a modulator for modulating the beam in response to an image signal input to provide an image beam for exposing a recording member, a variable attenuator for controlling the intensity of the beam, the attenuator comprising: a liquid crystal cell for imparting controlled alteration of the polarization of the beam; a source of electrical potential for generating an external electric field across the crystal cell to vary the degree of polarization alteration of the beam by the crystal cell; and a polarization analyzer for detecting the degree of polarization alteration of the beam effected by the crystal cell, the analyzer including a polarizing beam splitter following the crystal cell for separating the beam into primary and secondary beams, and control means response to the intensity of the secondary beam for controlling the source of electrical power to vary the electrical field across the crystal cell whereby to vary the degree of polarization alteration of the beam by the crystal cell so as to maintain the intensity of the beam substantially constant.

IN THE DRAWINGS

Figure 1:
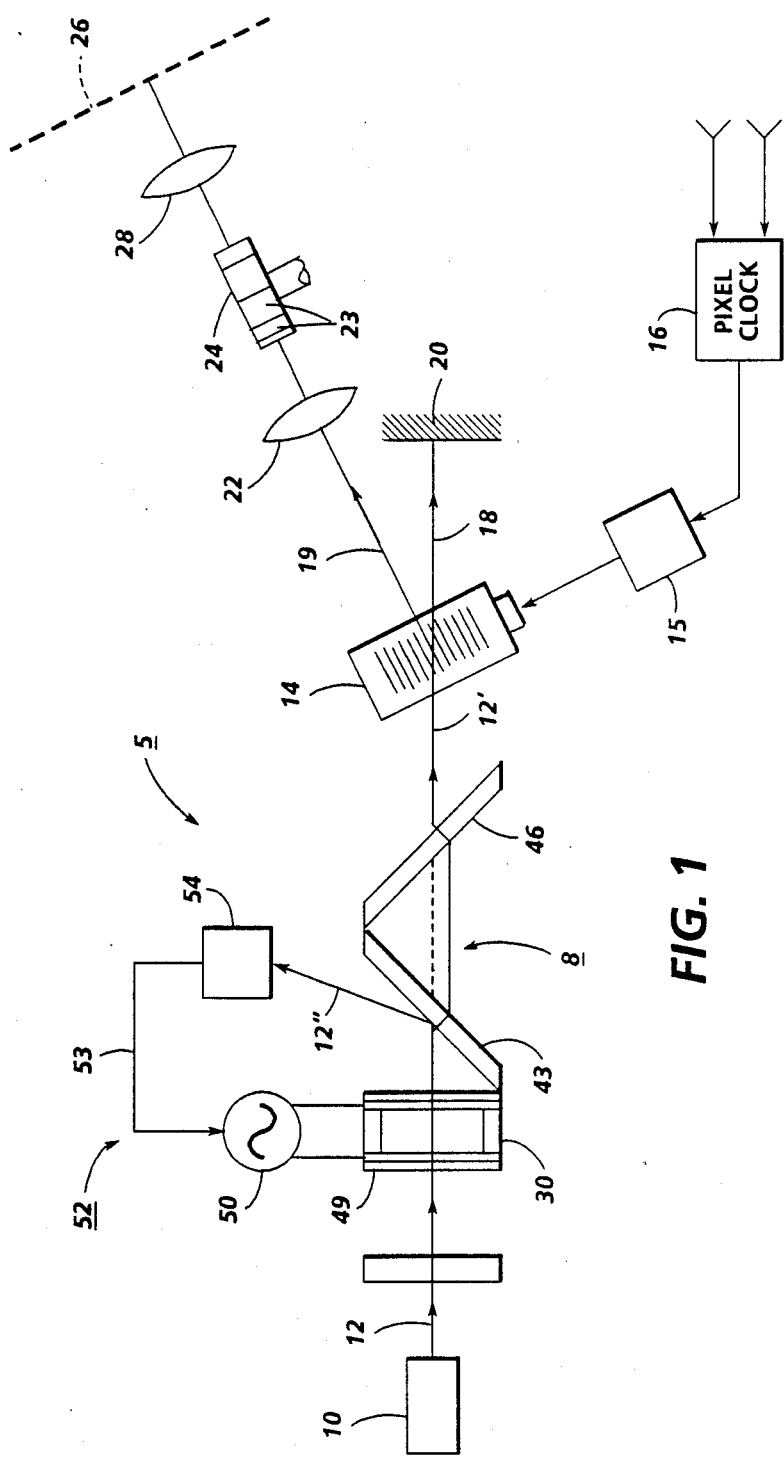
FIG. 1 is a schematic view of a raster output scanner incorporating the variable attenuator of the present invention for controlling scanning beam intensity.

Referring to FIG. 1 of the drawings, there is shown an exemplary raster output scanner or ROS, designated generally by the numeral 5, incorporating the variable attenuator 8 of the present invention. Scanner 5 includes a suitable source of high intensity radiation such as laser 10, the output beam 12 of which is modulated by a suitable modulating device such as acousto-optic (A/O) modulator 14 in accordance with an image signal input from image signal source 15 to provide zero and first order beams 18, 19. Zero order beam 18 is impinged against a suitable stop 20 while beam 19, which comprises the imaging beam, is focused by a suitable lens 22 onto the mirrored surfaces or facets 23 of a scanning element shown here in the form of a rotating polygon 24. Polygon 24 scans the imaging beam 19 across a recording member such as the previously charged photoreceptor 26 of a xerographic reproduction system to expose the charged photoreceptor line by line and create a latent electrostatic image representative of the image signal input from image signal source 15. Polygon 24 scans beam 19 in the fast scan or X direction across photoreceptor 26 while the photoreceptor is moved concurrently in the slow scan or Y direction at a suitable rate. An imaging lens 28 focuses the imaging beam 19 onto photoreceptor 26.

Image signal source 15 may comprise any suitable source of image signals, such as a communication channel, memory, raster input scanner, etc. The image signals are clocked out from image signal source 15 a line at a time by the clock signal output of a pixel clock 16, clock 16 being triggered on and off in response to the start and end of each scan line as by suitable Start-Of-Scan (SOS) and End-Of-Scan (EOS) sensor means (not shown).

The latent electrostatic image created on photoreceptor 26 by the imaging beam 19 is developed by a suitable toner. The developed image is thereafter transferred to a suitable copy substrate such as a copy sheet and fused or fixed to provide a permanent copy or print.

Figure 2:
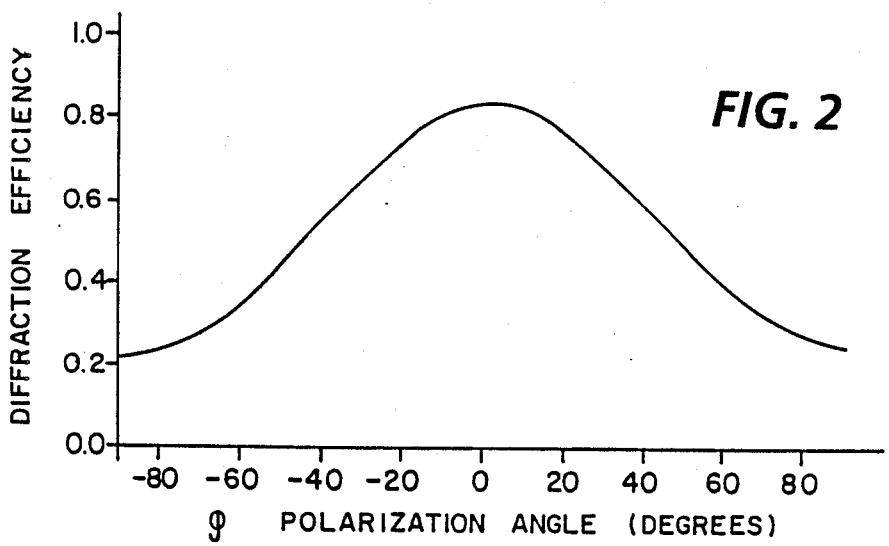
FIG. 2 is a graph plotting the diffraction efficiency of a typical modulator versus the polarization angle of the beam incident thereon.

In the design of high speed and/or high resolution scanners, it may be desirable to use a polarized laser with a highly polarization sensitive, broadband modulator. As shown in FIG. 2, the diffraction efficiency of a modulator such as modulator 14 is a function of the orientation ($\Phi$) of the optical polarization angle with respect to the Bragg plane, with the maximum diffraction efficiency occurring at $\Phi=0°$ and the minimum diffraction efficiency occurring at $\Phi=90°$. The ratio of maximum diffraction efficiency to minimum diffraction efficiency is approximately 3.7:1. As will appear, variable attenuator 8 enables the optical polarization angle to be rotated to control the diffraction efficiency.

Figure 3:
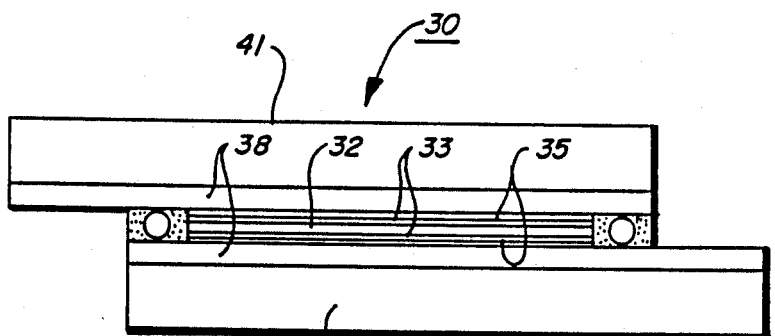
FIG. 3 is a sectional view of a twisted nematic liquid crystal illustrating the internal construction thereof.

Variable attenuator 8 includes a twisted nematic liquid crystal 30 of the type shown in FIG. 3. Crystal 30 has a relatively thin nematic liquid crystal layer 32 sandwiched between alignment layers 33. Dielectric barrier layers 35 are disposed between alignment layers 33 and transparent electrode layers 38 with outer glass substrates 41 covering electrode layers 38.

In the absence of an external electric field (V=0), a nematic liquid crystal rotates the plane of polarization of a linearly-polarized beam of light incident thereon through the twist angle of the liquid crystal cell 30. Thus, a 90° twist will lead to 90° rotation.

If an alternating voltage $V_o$, which is higher than the crystal threshold value ($V_c$) by a few volts, is applied to the cell, the direction of the molecular orientation pattern of the crystal will be realigned and become parallel to the applied field, that is, normal to the cell walls. This destroys the rotatory power of the cell and accordingly there will be no rotation of the plane of polarization of the incident light and hence no alteration or change in the polarization of the beam.

Figure 4:
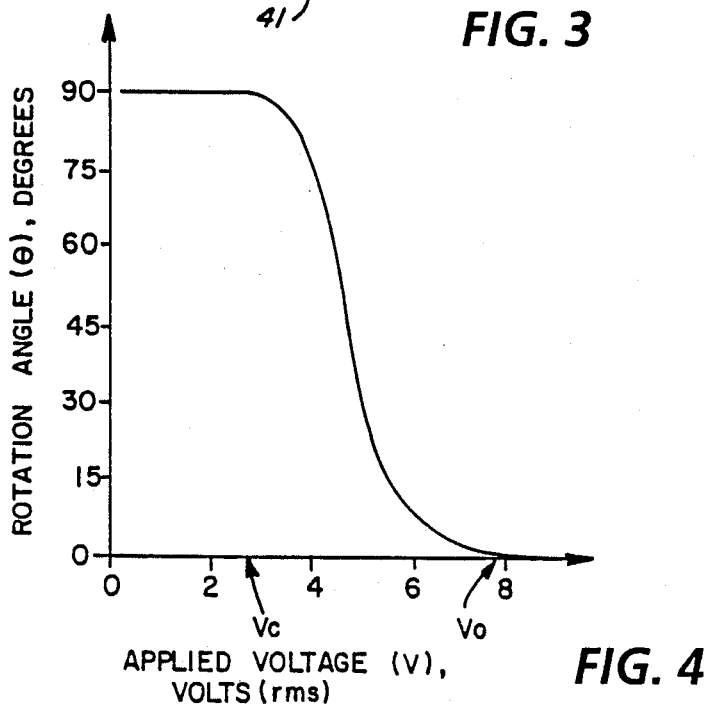
FIG. 4 is a graph plotting the degree of rotation imposed by a twisted nematic liquid crystal on the plane of polarization of an incident beam versus applied voltage.

FIG. 4 shows the dependence of the rotation angle $\theta$ of an incident linearly polarized light on the applied voltage for a typical twisted nematic liquid crystal. It can be seen that by applying an intermediate voltage V ($V_c \leq V \leq V_o$) to the crystal, the polarization of the light can be rotated continuously from 0° to 90°.

Figure 5:
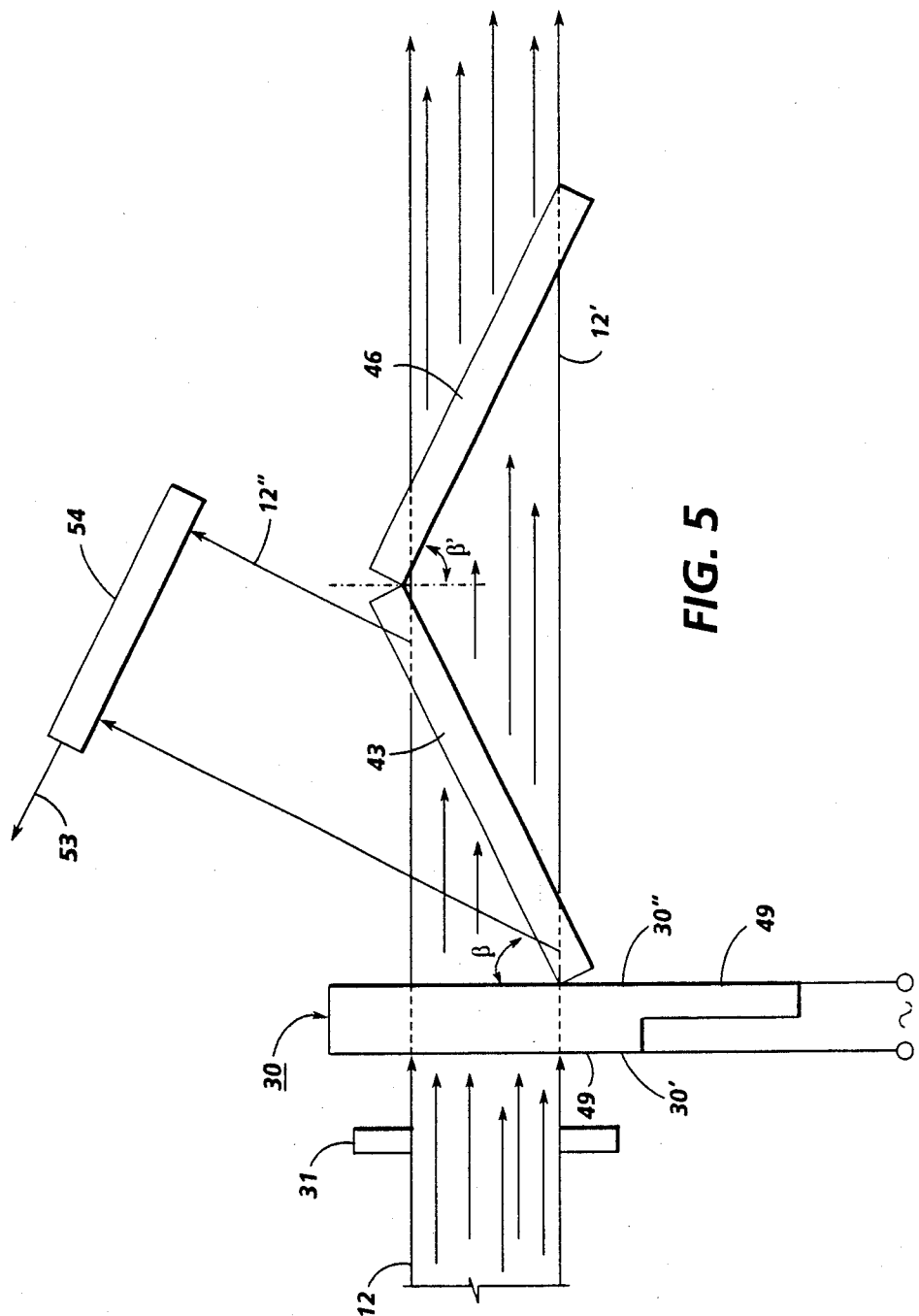
FIG. 5 is an enlarged schematic view showing details of the analyzing polarizer portion of the variable attenuator of the present invention.

Referring now to FIGS. 1 and 5, crystal 30 of variable attenuator 8 is disposed athwart the path of beam 12 at a point upstream of modulator 14. Aperture 31 controls the dimension of the beam 12 impinging on crystal 30. A source of variable electrical potential, i.e., a.c. voltage source 50 provides a voltage $V_o$ for controlling the twist angle of crystal 30, voltage source 50 being controlled through a feed back loop 52 in response to the intensity of the beam. Feedback loop 52 has a polarization analyzer in the form of a multi-layer dielectric polarizing beam splitter 43 downstream of crystal 30 which separates the beam 12 emitted by crystal 30 into primary beam (P) 12' and second (S) beam ", the later for use in analyzing the intensity of the beam output by crystal 30. To measure beam intensity, secondary beam 12" is impinged on a suitable detector such as photocell 54. The signal output of photocell 54 is fed via line 53 to the controller for voltage source 50 to control the voltage $V_o$ applied to crystal 30 and accordingly the degree of alteration of the plane of polarization of primary beam 12 by the crystal 30.

Beam splitter 43 comprises a plate-like element with a multi-layer dielectric thin film coating and disposed at an optimum angle of incidence $\beta$ with respect to the axis of the beam output by crystal 30. The angle of incidence $\beta$, which depends on the exact composition of the dielectric layers, is relatively large, a suitable angle being approximately 33°. However, the relatively large angle of incident tends to introduce undesirable aberrations such as displacement of the beam and astigmatism. Where the astigmatism is objectionable, to restore the primary beam 12' to its normal path and remove the astigmatism, a blank glass plate 46 can be positioned on the downstream side of beam splitter 43. Glass plate 46 is set at an angle of incidence $\beta'$ equal to but opposite from the angle of incidence $\beta$ of beam splitter 43.

To optimize optical efficiency and throughput, both surfaces 30', 30" of crystal 30 are coated with an anti-reflective coating 49 such as a single quarter wave layer of Magnesium fluoride, or a multi-layer dielectric stack. And where it is desired to have plate 46 at an angle different than that of plate 43 so as to leave a degree of astigmatism, both surface of plate 46 may be coated with a suitable anti-reflection dielectric coating.

While modulator 14 is shown with the modulator diffraction plane normal to the scanning plane, the invention is also applicable to the situation where the diffraction plane of A/O modulator 14 is in the same plane as the scanning direction. In that case, the output polarization of primary beam 12 at the exit of the variable attenuator 8 will, through the ensuing optics (not shown) enter modulator 14 at a predictable angle which must be known in order to position A/O modulator 14 for maximum acousto-optic efficiency. It will be understood that the relative orientation of attenuator 8 and modulator 14 may be adjusted for optimum performance.

Figure 6:
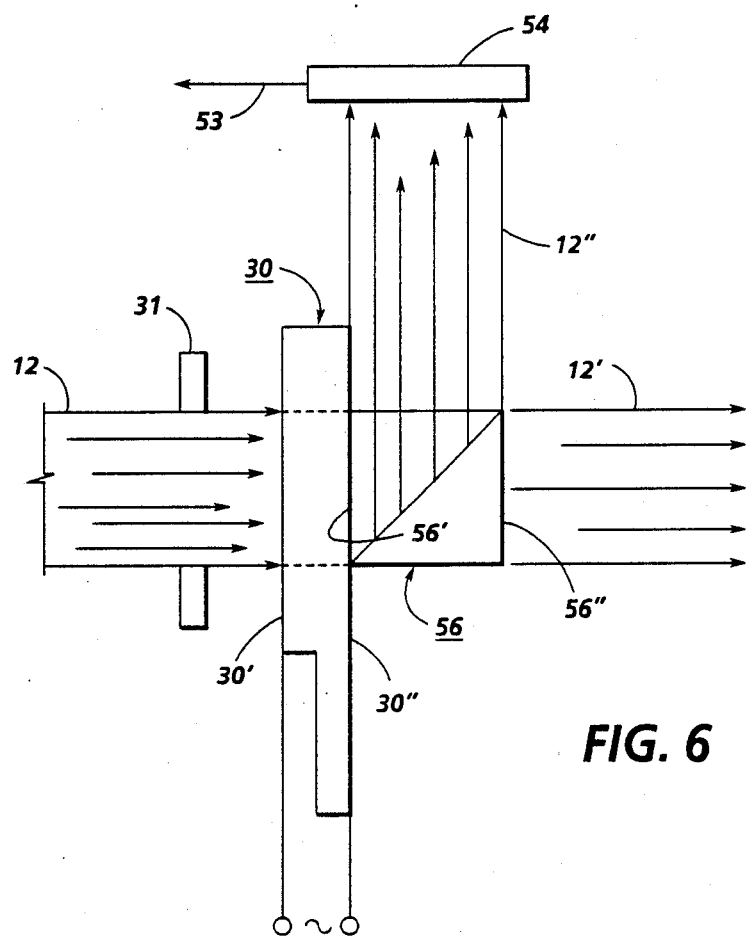
FIG. 6 is a schematic view of an alternate embodiment in which a polarizing beam cube is used as an analyzing polarizer.

In the embodiment shown in FIG. 6, where like numerals refer to like parts, the multi-layer dielectric polarizing beam splitter 43 and corrective glass plate 46 are replaced by a polarizing beam cube 56. In this embodiment, anti-reflective coatings are placed on the liquid crystal cell 30 on the surface 30' and on exit surface 56" of the polarizing cube 56. the adjacent surfaces 30" of crystal 30 and 56' of cube 56 may have either antireflective coatings or the crystal 30 and cube 56 may be joined by an indexmatching cement which minimizes reflections and the resulting losses from these surfaces.

Figure 7:
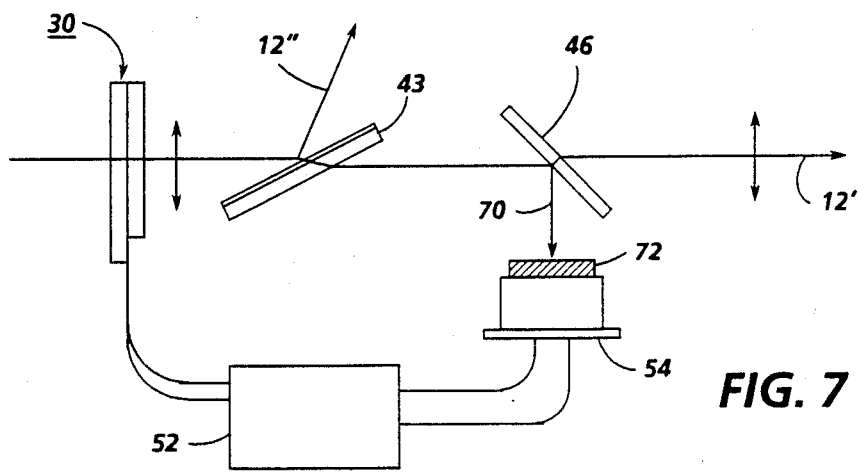
FIG. 7 is a schematic view of another alternate embodiment in which a glass plate is used as the feedback beam splitter.
Figure 8:
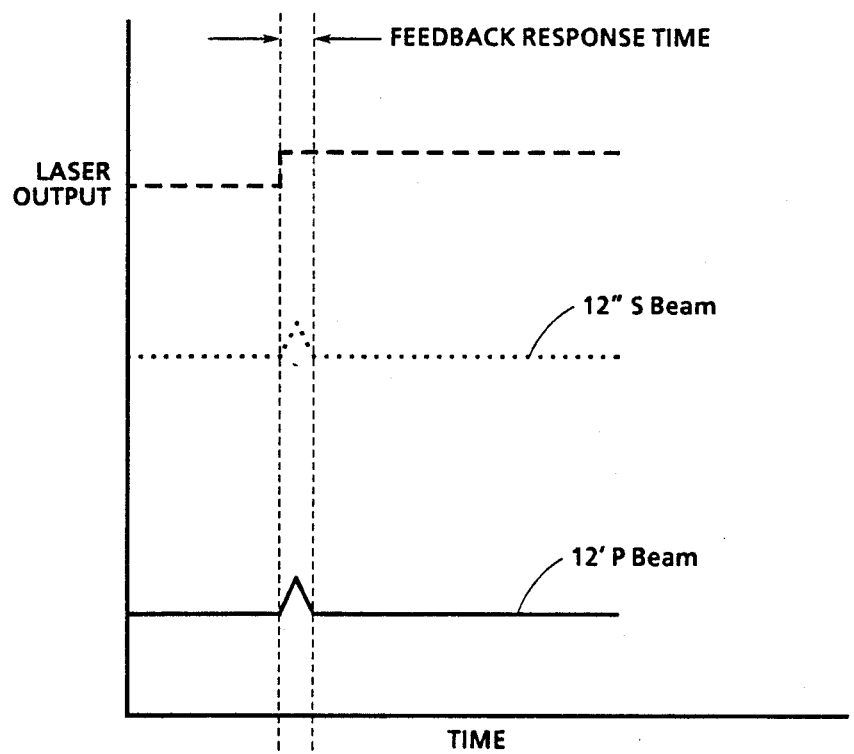
FIG. 8 is a graph depicting the effect of using the secondary beam as the feedback beam on the output of the variable attenuator of the present invention.

In the embodiment shown in FIGS. 7 and 8, where like numbers refer to like parts, glass plate 46 is used as the feedback beam splitter instead of beam splitter 43. This permits advantageous use of variable attenuator 8 as a means to compensate for fluctuations in the output of laser 10.

As can be seen from FIG. 8, where secondary beam 12" is used as the feedback beam, variable attenuator 8 keeps the secondary beam 12" of polarization plate 43 constant. This can cause the net output of attenuator 8 to fluctuate as primary beam 12' attempts to compensate.

In the FIG. 7 embodiment, a small percentage 70 (i.e., approximately 1%) of the primary beam polarization is deflected by glass plate 46 onto photocell 54 of feedback loop 52. Plate 46 is slightly off of the Brewster angle so that a non-zero quantity is deflected.

However, because polarization plate 43 is not perfect in its rejection of the secondary beam component, and because a significant portion of the beam may be deflected by glass plate 46 onto feedback photocell 54, there could arise a certain attenuation level of the beam where photocell 54 would be significantly 'polluted' by the spurious amount of secondary beam component, resulting in erroneous feedback, and nonlinear control of output beam 12. To obviate this, a small polarizer 'dot' 72 is placed on photocell 54. Dot 74 permits only the reflected primary component to pass through. As a result, a substantially constant output through feedback circuit 52 is obtained regardless of laser variation.

It will be understood the above is only true so long as laser 12 delivers sufficient power to satisfy the intensity level desired. Should laser power drop too mucn, feedback loop 52 will be unable to compensate. At that point, a suitable fault or failure signal would be generated.

Polarization plates such as plate 43 are difficult to manufacture. Further, the angle of incidence $\beta$ has been found to be unpredictable. To obviate this, polarization plate 43 may be supported in an adjustable cylindrical housing or 'barrel' (not shown) in order to permit fine adjustment in the position of plate 43 to be made.

While a twisted nematic liquid crystal 30 is shown and described other suitable liquid crystal types such as cholesteric liquic crystals, electrically controlled birefringence of parallel aligned liquid crystals, 'supertwist' liquid crystals, etc., may be used instead.

While the invention has been described with reference to the structure disclosed, it is not confined to the details set forth, but is intended to cover such modifications or changes as may come within the scope of the following claims.

We claim:

1. In a raster output scanner having a laser providing a high intensity beam, and a modulator for modulating the beam in response to an image signal input to provide an image beam for exposing a recording member, a variable attenuator upstream of said modulator for controlling the intensity of said beam, comprising:
   (a) a liquid crystal cell for imparting controlling alteration of the polarization of said beam;
   (b) a source of electrical potential for generating an external electric field across said crystal cell to vary the degree of alteration of the polarization of said beam by said crystal cell; and
   (c) a polarization analyzer for detecting the degree of alteration of the polarization of said beam effected by said crystal cell, said analyzer including
      (1) a polarizing beam splitter following said crystal cell for separating said beam into primary and secondary beams, and
      (2) control means responsive to the intensity of said secondary beam for controlling said source of electrical power to vary the electrical field across said crystal cell whereby to vary the degree of rotation of said beam by said crystal cell so as to maintain the intensity of said beam substantially constant.

2. The raster output scanner according to claim 1 including means for correcting for undesirable aberrations in said primary beam resulting from said beam splitter.

3. The raster output scanner according to claim 1 in which said liquid crystal cell comprises a twisted nematic liquid crystal.

4. The raster output scanner according to claim 2 in which the surfaces of said cell, said analyzer, and said optical element are covered with an anti-reflective coating.

5. The raster output scanner according to claim 4 in which said polarizing beam splitter comprises a thin film polarizing plate, said thin film polarizing plate being at a predetermined angle of incidence to said beam;
   said aberration correcting means comprising a transparent plate following said thin film polarizing plate, the angle of incidence of said transparent plate being equal to but opposite from the angle of incidence of said thin film polarizing plate.

6. The raster output scanner according to claim 5 in which said polarization analyzer and said aberration correcting means comprise a beam splitting polarizing cube.

7. The raster output scanner according to claim 4 in which said control means includes a beam intensity detector in the path of said secondary beam for producing a signal representative of the intensity of the beam discharged from said crystal cell and polarizer.

8. In a raster output scanner having a laser providing a high intensity beam, and a modulator for modulating the laser beam in response to an image signal input to provide an image beam for exposing a recording member, a variable attenuator upstream of said modulator for controlling the intensity of said laser beam, comprising:
  (a) a liquid crystal cell for imparting controlled alteration to the polarization of said laser beam;
  (b) a source of electrical potential for generating an external electric field across said crystal cell to vary the degree of alteration to the polarization of said beam by said crystal cell;
  (c) a feedback loop for controlling said source of electrical potential to vary the degree of alteration to the polarization of said laser beam by said crystal cell and thereby the intenstiy of said laser beam, said feedback loop including
    (1) a polarizing beam splitter following said crystal cell for separating said laser beam into a first beam for use as said image beam and a second beam, and
    (2) a transparent plate for deflecting a part of said first beam from said polarizing beam splitter whereby to provide a third beam; and
  (d) control means responsive to the intensity of one of said second and third beams for controlling said source of electrical power to vary the electrical field across said crystal cell whereby to vary the degree of alteration to the polarization of said laser beam by said crystal cell and maintain the intensity of said first beam substantially constant.

9. The scanner according to claim 8 in which said control means includes a photocell in the path of said third beam for sensing the intensity of said third beam; and
  polarizer means between said third beam and said photocell to control impingement of said third beam on said photocell.

10. In a raster output scanner having a laser providing a high intensity beam, and a modulator for modulating the laser beam in response to an image signal input to provide an image beam for exposing a recording member, a variable attenuator upstream of said modulator for controlling and compensate for fluctuations in the intensity of said laser beam, comprising:
  (a) a liquid crystal cell for imparting controlled alteration to the polarization of said laser beam;
  (b) a source of electrical potential for generating an external electric field across said crystal cell to vary the degree of lateration to the polarization of said laser beam by said cyrstal cell;
  (c) a polarization analyzer including
    (1) first means following said crystal cell for separating said laser beam into primary and secondary beams, and
    (2) second means following said first means for deflecting a part of said primary beam whereby to form a third beam; and
  (d) control means responsive to the intensity of said third beam for controlling said source of electrical power to vary the electrical field across said crystal cell whereby to vary the degree of alteration to the polarization of said laser beam by said crystal cell so as to maintain the intensity of said primary beam substantially constant and compensate for intensity fluctuations in the output of said attenuator.

* * * * *